(12) United States Patent
Wee et al.

(10) Patent No.: US 8,027,635 B2
(45) Date of Patent: Sep. 27, 2011

(54) RELAYING THIRD PARTY WIRELESS COMMUNICATIONS THROUGH A PORTABLE WIRELESS SYSTEM

(75) Inventors: Susie J. Wee, San Carlos, CA (US); John Apostolopoulos, San Carlos, CA (US); Marc P. Schuyler, Mountain View, CA (US); Jason Brown, Morges (CH)

(73) Assignee: Hewlett-Packard Development Company, L.P., Houston, TX (US)

( * ) Notice: Subject to any disclaimer, the term of this patent is extended or adjusted under 35 U.S.C. 154(b) by 2513 days.

(21) Appl. No.: 10/153,095

(22) Filed: May 22, 2002

(65) Prior Publication Data

US 2003/0220074 A1    Nov. 27, 2003

(51) Int. Cl.
*H04B 7/15* (2006.01)
(52) U.S. Cl. ...................................... 455/11.1; 455/406
(58) Field of Classification Search ................. 455/11.1, 455/406, 407, 550.1, 414.1, 13.1, 517; 379/114.1–127.05
See application file for complete search history.

(56) References Cited

U.S. PATENT DOCUMENTS

| | | | |
|---|---|---|---|
| 5,612,948 A * | 3/1997 | Fette et al. ..................... | 370/252 |
| 5,983,073 A | 11/1999 | Ditzik | |
| 6,044,062 A | 3/2000 | Brownrigg et al. | |
| 6,104,712 A | 8/2000 | Robert et al. | |
| 6,151,500 A | 11/2000 | Cardina et al. | |
| 6,154,650 A | 11/2000 | Abidi et al. | |
| 6,233,464 B1 | 5/2001 | Chmaytelli | |
| 7,222,088 B2 * | 5/2007 | Nishikado et al. .............. | 705/26 |

| | | | |
|---|---|---|---|
| 2002/0115455 A1 * | 8/2002 | Umstetter et al. ............ | 455/462 |
| 2002/0018776 A1 | 12/2002 | Cheng et al. | |
| 2003/0054795 A1 * | 3/2003 | Tamaki et al. ................ | 455/406 |

FOREIGN PATENT DOCUMENTS

| | | |
|---|---|---|
| WO | WO00/54539 | 9/2000 |
| WO | WO00/69186 | 11/2000 |
| WO | WO01/13660 | 2/2001 |
| WO | WO01/22643 | 3/2001 |
| WO | WO02/51038 | 6/2002 |
| WO | WO 02/51038 A1 * | 6/2002 |

OTHER PUBLICATIONS

ETSI—"Universal Mobile Telecommunciations System (UMTS); UE Procedures in Idle Mode and Procedures for Cell Reselection in Connected Mode"—ETSI TS 125 304—Jun. 2000; pp. 1-46.

(Continued)

*Primary Examiner* — Nay Maung
*Assistant Examiner* — Angelica Perez (57) ABSTRACT

A portable wireless system is described. The portable wireless system has a controller that is operable to selectively configure the portable wireless system as a personal electronic appliance or a third party wireless repeater that is configured to relay wireless signals between a third party electronic appliance and a wireless network. Accordingly, the portable wireless system (e.g., a cellular telephone, a pager or a personal digital assistant) may act as a wireless repeater for third party wireless communications when the portable wireless system otherwise is not in use. In this way, the portable wireless system increases the utilization of existing wireless network infrastructures (e.g., a cellular telephone network) by making one or more unused wireless channels available to other devices. A novel incentives-based business model that encourages owners of portable electronic appliances to fully utilize existing wireless network capacity also is described.

26 Claims, 5 Drawing Sheets

OTHER PUBLICATIONS

B Willis et al—"Exploiting Peer-to-Peer Communications—Mesh Fixed and ODMA Mobile Radio"—Journal of the Institution of British Telecommunications—vol. 2 No. Part 2—Apr. 2001—pp. 48-53.

Bluetooth Usage Models, The Official Bluetooth Website, <http://www.bluetooth.com/bluetoothguide/models>, 3 pages (downloaded Jun. 5, 2001).

Bluetooth: Cutting Cabels—Connecting Devices, <www.bluetooth.com>, 7 pages (Jul. 5, 2000).

Brent A. Miller, "Bluetooth Applications in Pervasive Computing," IBM, 5 pages, (Feb. 2000).

White Paper: Bluetooth and Bluetooth Internet Access Points, Pico Communications, Inc., <www.picocommunications.com>, 8 pages (downloaded Jun. 5, 2001).

Bluetooth Beginners Guide, <http://www.xelchina.com/FILES/Bluetooth%20Beginners'%20Guide.pdf>, 9 pages (Nov. 27, 2000).

* cited by examiner

RELAYING THIRD PARTY WIRELESS COMMUNICATIONS THROUGH A PORTABLE WIRELESS SYSTEM

TECHNICAL FIELD

This invention relates to systems and methods for relaying third party wireless communications through a portable wireless system.

BACKGROUND

A wide variety of different portable wireless systems, such as cellular telephones, pagers and wireless personal digital assistants (PDAs), have been developed to enable users to communicate without being tied to a particular physical location. A cellular telephone network may be used by owners of such devices to wirelessly transmit voice and data communications to others connected to the network. Examples of cellular telephone networks include AMPS, D-AMPS, GSM, and IS-95 (CDMA). Such cellular telephone networks typically include a plurality of base stations each serving the cellular telephones within their geographic area, one or more base station controllers, and at least one mobile switching center. In general, a cellular telephone network covers a specific geographic area that typically is divided into cells (or regions). Each cell is allocated one or more voice/data channels or traffic/control channels, or both. A cellular telephone network usually has a broadcast channel on which all cellular telephones may obtain system information from the base stations or measure signal strength or signal quality, or both. A cellular telephone call is handed off from one cell (the serving cell) to a neighboring cell based upon the relative signal strength or quality between the cellular telephone and the base stations of the neighboring cells.

A number of different cellular telephone systems have been proposed. For example, many different multi-mode cellular telephones that switch between different types of telecommunication networks have been proposed. In one such system, a cellular telephone is configured to switch from a cellular telephone system to a wireline cordless telephone system when the cellular telephone is within range of a cordless telephone base station. Other cellular telephone systems allow an electronic appliance, such as a handheld computer or a laptop computer with an appropriate interface card, to transmit data over a wireless cellular telephone communication channel. The electronic appliance may be cellular-enabled or it may be coupled to a cellular telephone through a wired or wireless connection.

Recently, several low-power and low-cost wireless interfaces between electronic appliances have been proposed. For example, Bluetooth is a recently proposed universal wireless interface that operates within the ISM band (2.4-2.48 GHz) and allows portable electronic appliances to connect and communicate over short-range, ad hoc networks. A Bluetooth-enabled electronic appliance may communicate simultaneously with up to seven other similarly enabled electronic appliances to form a small local radio network. Among the applications that have been proposed for Bluetooth and other wireless interfaces are a three-in-one phone, an untethered computer, and a universal remote. A three-in-one could be used as a standard cellular phone, using a wireless carrier service. The phone also could be used as a cordless phone through a Bluetooth access point that is connected to a conventional wired telephone network. Finally, the phone could also be used as an intercom with direct point-to-point communications with similar devices, without involving any wireless carrier service. An untethered computer (e.g., a laptop computer) could be connected to a network such as the Internet via a Bluetooth modem access point. The modem access point would provide connectivity to the network in the normal fashion, such as over cellular telephony channels, telephone lines, cable or ISDN, but the computer would not be connected physically to the modem. A universal remote may be any Bluetooth device (e.g., a PDA or smartphone) that could be used to query and control other Bluetooth devices within communication range of the universal remote. Still other applications for such wireless interfaces have been proposed.

SUMMARY

The invention features a scheme (systems and methods) for selectively configuring a portable wireless system as a personal electronic appliance or a third party wireless repeater that is configured to relay wireless signals between a third party electronic appliance and a wireless network. The invention enables a personal electronic appliance (e.g., a cellular telephone, a pager or a personal digital assistant) to act as a wireless repeater for third party wireless communications when the personal electronic appliance otherwise is not in use. In this way, the inventive portable wireless system increases the utilization of existing wireless network infrastructures (e.g., a cellular telephone network) by making one or more unused wireless channels available to other devices. In addition, the invention features a novel incentives-based business model that encourages owners of portable electronic appliances to fully utilize existing wireless network capacity.

In one aspect, the invention features a controller that is operable to selectively configure the portable wireless system as a portable electronic appliance or a third party wireless repeater that is configured to relay wireless signals between a third party electronic appliance and a wireless telecommunication network.

Embodiments in accordance with this aspect of the invention may include one or more of the following features.

The controller may be operable to selectively configure the portable wireless system as a personal electronic appliance or a third party wireless repeater in response to a received mode selection signal. The mode selection signal may be embedded in a received wireless communication signal or the mode selection signal may be received from a mode selection switch of the portable wireless system. In some embodiments, the controller is operable to enable the portable wireless system to relay third party wireless signals whenever the portable wireless system is available.

The controller preferably is operable to wirelessly seek and detect appropriately configured third party portable electronic appliances. The controller may be operable to transmit an indication that the portable wireless system is available as a wireless repeater for third party communications.

The system may include a short range wireless communication system for communicating with third party portable electronic appliances, and a long range wireless communication system for communicating with the wireless telecommunication network. The short range wireless communication system and the long range wireless communication system each may include an antenna, an RF receiver, and an RF transmitter.

In some embodiments, the controller may be configured to wirelessly solicit payment directly from the third party electronic appliance.

In another aspect, the invention features a wireless telephony method in accordance with which an incentive is provided to a portable wireless system owner in response to a received third party communication that is relayed by the portable wireless system.

Embodiments in accordance with this aspect of the invention may include one or more of the following features.

The incentive may be provided to the portable wireless system owner based upon a received portable wireless system identifier. The incentive may be in the form of a discounted wireless service price or a coupon, or may correspond to provision of the portable wireless system free of charge.

Preferably it is determined whether a received wireless communication corresponds to a relayed third party communication.

A fee may be charged to an owner of a third party electronic appliance that transmitted the received third party communication. In some embodiments, payment may be transmitted to the portable wireless system from a third party electronic appliance that transmitted the received third party communication. In these embodiments, the portable wireless system may solicit payment from the third party electronic appliance.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
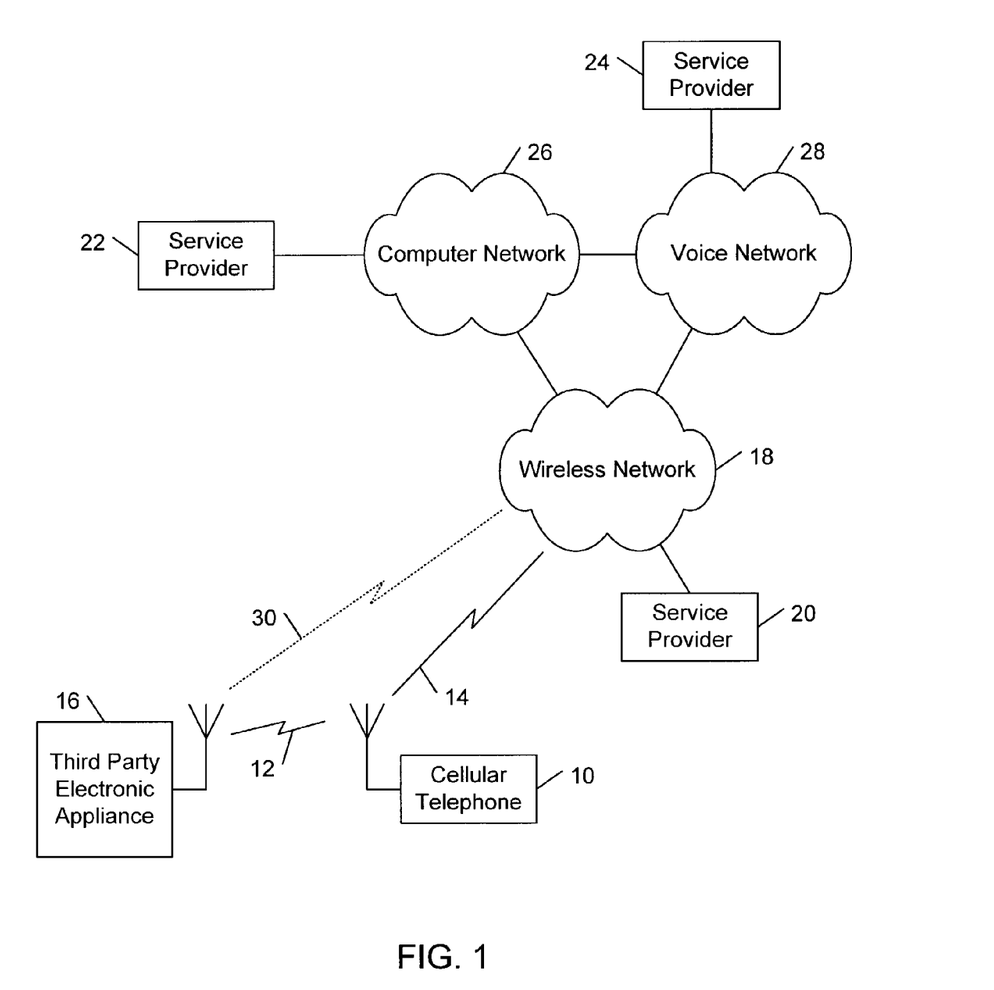
FIG. 1 is a block diagram of a portable wireless system relaying wireless signals between a third party electronic appliance and a wireless telecommunication network.

Referring to FIG. 1, in one embodiment, a portable wireless system 10 (a cellular, telephone in the illustrated embodiment) is selectively configurable between a personal electronic appliance mode of operation and a third party wireless repeater mode of operation. In the personal electronic appliance mode, portable wireless system 10 operates as a conventional personal electronic appliance (e.g., a cellular telephone, a cordless telephone, a pager, a PDA, a digital audio player, or a laptop computer). In the third party wireless repeater mode, portable wireless system 10 is configured to relay wireless signals 12, 14 between a third party electronic appliance 16 and a wireless network 18. As used herein, a "third party" device refers to a device that is not specifically authorized to utilize the wireless channel that is established between portable wireless system 10 and wireless network 18, and is not registered in advance with portable wireless system 10. Third party electronic appliance 16 may be any conventional electronic appliance that is configured to communicate wirelessly with portable wireless system 10, including a cellular telephone, a cordless telephone, a pager, a PDA, a digital audio player, or a laptop computer.

Portable wireless system 10 may communicate with third party electronic appliance 16 over one or more radio frequency (RF) or infrared (IR) communication channels in accordance with a particular communication protocol (or interface). The RF communication channels typically may lie within the 46-49 MHz frequency band, the 902-928 MHz frequency band, or the 2.4-2.48 GHz frequency band. The RF communication protocol may be any of the low-power radio communication protocols that have been proposed, including the Bluetooth communication protocol and the IEEE 802.11 (radio-LAN) communication protocol. An example of an IR communication protocol is the IrDA (Infrared Data Association) communication protocol. Portable wireless system 10 may communicate with wireless network 18 over one or more conventional radio frequency (RF) communication channels (e.g., a conventional cellular or a 3G or 4G wireless communication channel) in accordance with a conventional RF communication protocol (e.g., the Wireless Application Protocol (WAP)).

Through the wireless communication channel established by portable wireless system 10 between third party electronic appliance 16 and wireless network 18, third party electronic appliance 16 may access a wide variety of different services that are provided by one or more service providers that are connected directly or indirectly to wireless network 18. For example, third party electronic appliance 16 may access services offered by a service provider 20, which is connected directly to wireless network 18. Third party electronic appliance 16 also may access services offered by service providers 22, 24, which are connected indirectly to wireless network 18 through a computer network 26 (e.g., the Internet) and a voice network 28, respectively. Among the kinds of services that may be accessed by third party electronic appliance 16 are data services, voice services, pager services, voice mail services, chatline services, and voice services. By acting as a wireless repeater for such third party wireless communications, portable wireless system 10 increases the utilization of existing wireless network infrastructures (e.g., a cellular telephone network) by making one or more unused wireless channels available to other devices.

In some embodiments, in addition to the indirect connection through portable wireless system 10, third party electronic appliance may be configured to establish its own direct connection 30 to wireless network 18. In these embodiments, the indirect connection 12, 14 through portable wireless system 10 may be used to increase the effective wireless bandwidth available to third party electronic appliance 16.

As explained in detail below, in some embodiments, portable wireless system 10 may be configured as a wireless repeater whenever the system is available (e.g., turned on and not using wireless communication channel 14). Alternatively, a mode selection switch may be provided to allow a user to selectively configure portable wireless system 10 as a personal electronic appliance or a third party wireless repeater. In still other embodiments, a mode selection signal may be transmitted by the wireless service provider to configure personal wireless system 10 as a third party wireless repeater when it is available (e.g., turned on and not using wireless communication channel 14). In these embodiments, the ability to selectively transmit mode selection signals to one or more portable wireless systems 10 may allow the wireless service provider to better balance network traffic. For example, the wireless service provider may enable a larger number of portable wireless systems 10 as third party wireless repeaters during times when the amount of conventional wireless traffic is expected to be low, and disable such functionality during times when conventional wireless traffic is expected to be high.

Figure 2:
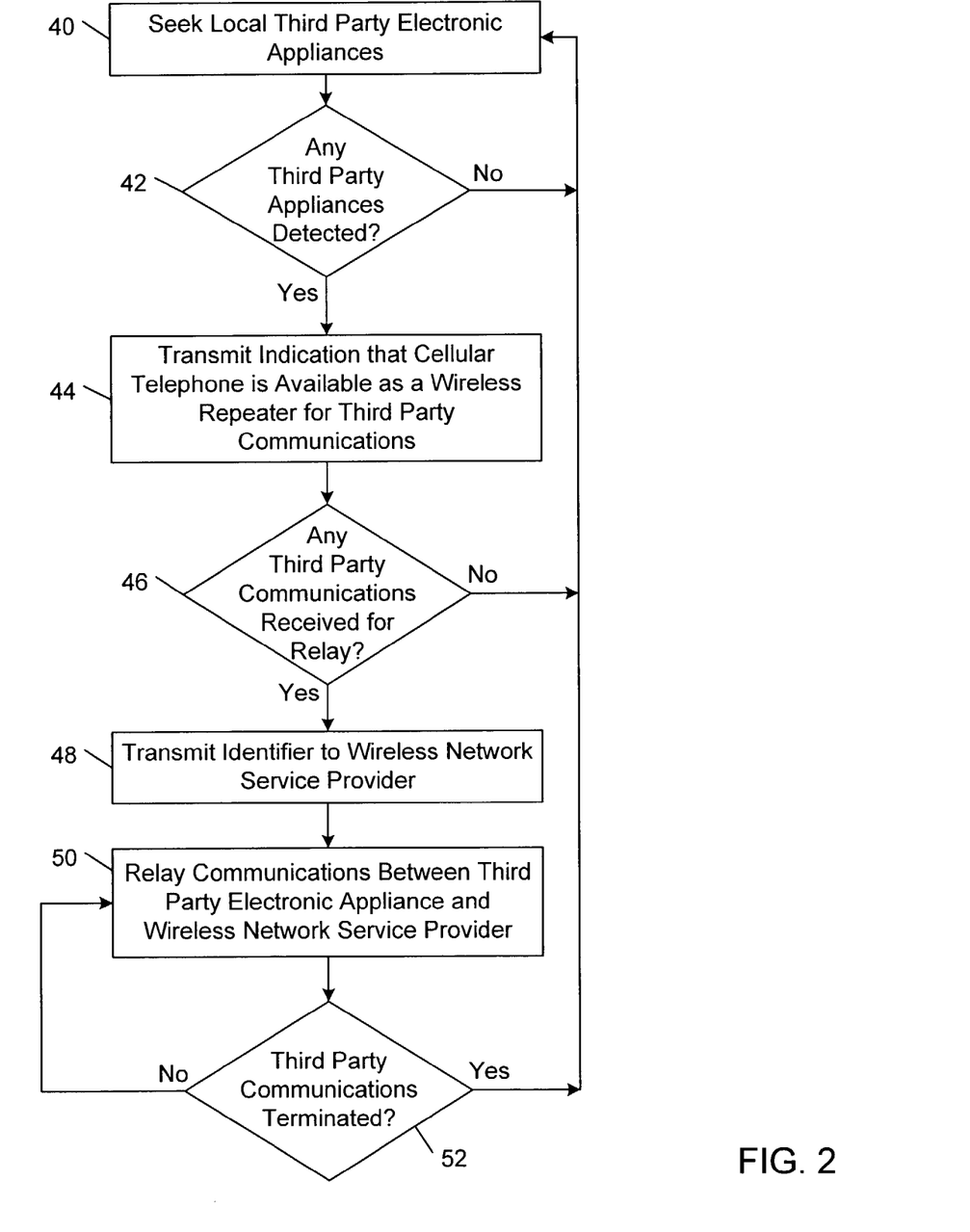
FIG. 2 is flow diagram of a wireless telephony method of relaying wireless signals between a third party electronic appliance and a wireless telecommunication network.

Referring to FIG. 2, in one embodiment, portable wireless system 10 may be configured to operate as a third party wireless repeater as follows. When available (e.g., turned on and operating in the third party wireless repeater mode), portable wireless system 10 periodically may seek local third party portable electronic appliances (step 40). Portable wireless system 10 may seek third party electronic appliances within communication range in accordance with a conventional seek-and-connect communication protocol. If an appropriately configured third party portable electronic appliance is not detected (step 42), portable wireless system 10 may continue to seek local third party portable electronic appliances until portable wireless system 10 is no longer available (e.g., turned off or no longer operating in the third party wireless repeater mode) (step 40). If an appropriately configured third party electronic appliance is detected (step 42), portable wireless system 10 may transmit to the detected appliance an indication that it is available as a wireless repeater for third party communications with wireless network 18 (step 44). If the detected third party electronic appliance responds by sending a third party communication for relay to wireless network 18 (step 46), portable wireless system 10 transmits to wireless network 18 an identifier that has been assigned to portable wireless system 10 (step 48). The identifier typically is assigned at the time portable wireless system 10 is registered with the wireless service provider. Next, portable wireless system 10 relays received communications between the third party electronic appliance and wireless network 18 (step 50) until the third party communications have terminated (step 52). If the detected third party electronic appliance does not send a third party communication for relay to wireless network 18 (step 46), portable wireless system 10 may continue to seek other local third party portable electronic appliances until portable wireless system 10 is no longer available (e.g., turned off or no longer operating in the third party wireless repeater mode) (step 40).

Figure 3:
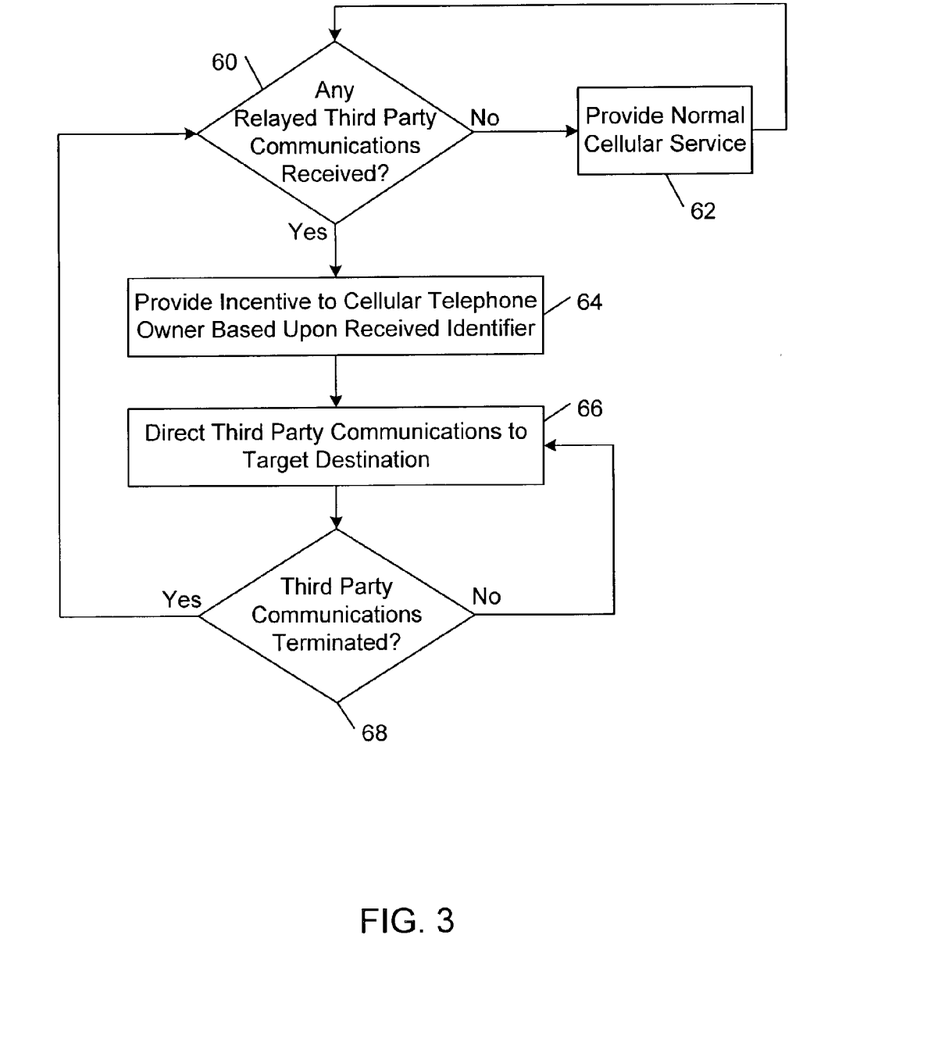
FIG. 3 is a flow diagram of a method by which a wireless service provider may handle third party communications that are relayed by a portable wireless system.

Referring to FIG. 3, in one embodiment, the wireless service provider linking portable wireless system 10 to wireless network 18 may handle relayed third party communications as follows. If no relayed third party communications are received (step 60), normal wireless service is provided to portable wireless system 10 (step 62). If a relayed third party communication is received (step 60), an incentive may be provided to the owner of portable wireless system 10 based upon the transmitted portable wireless system identifier (step 62). The incentive may be in the form of a discounted wireless service price or coupons for other services or products. In some embodiments, the incentive may be in the form of free portable wireless systems that are given to users, who may or may not be informed that the systems will be used as third party wireless repeaters. The incentive may be provided directly by the wireless service provider or indirectly by another service provider 20-24 (e.g., one or more service providers that are accessed by the third party electronic appliance). In some embodiments, the owner of the third party electronic device may be charged access fees and other charges directly by the wireless service provider. In still other embodiments, the owner of the third party electronic appliance may be required to pay the owner of portable wireless system 10 for use of the system as a third part wireless repeater. In these embodiments, portable wireless system 10 may solicit payment directly from the third party electronic appliance. An electronic payment system, such as PayPal (available from PayPal, Inc. of Omaha, Nebr., U.S.A.; www.paypal.com), may be used to wirelessly transmit payment directly from the third party electronic appliance to portable wireless system 10.

Figure 4:
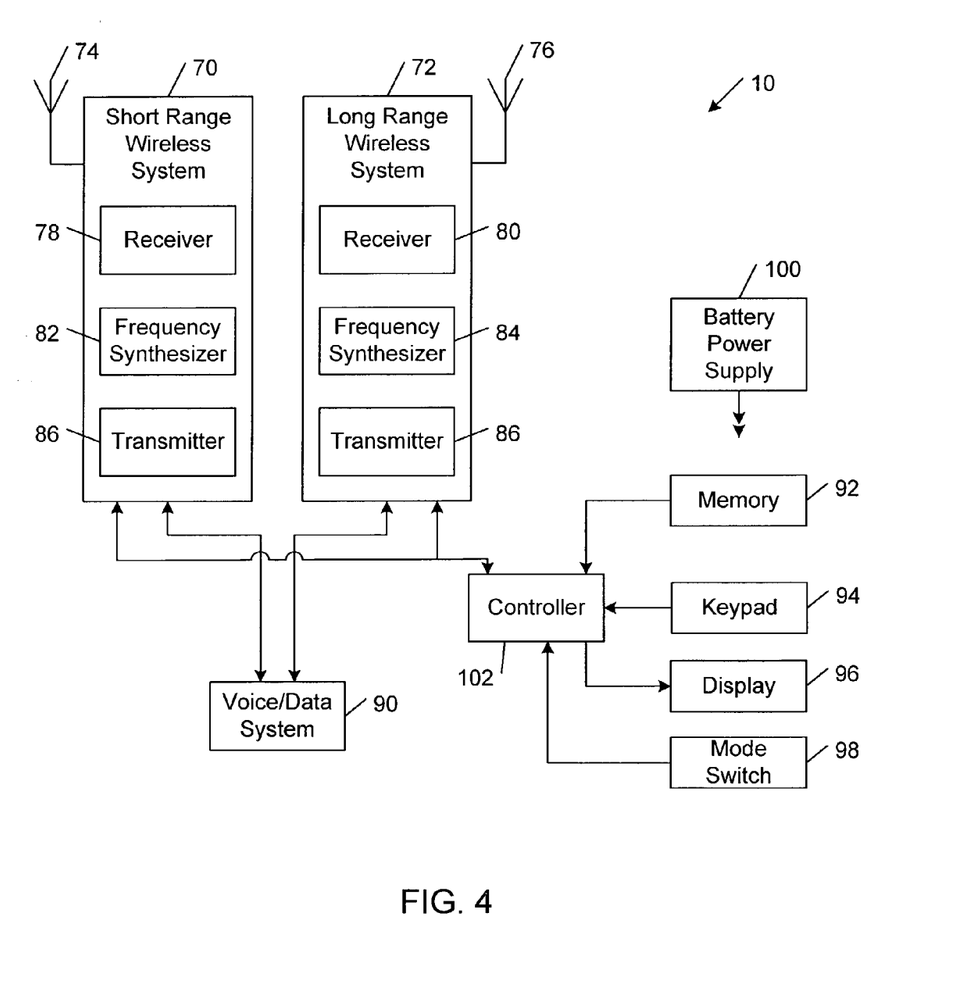
FIG. 4 is a block diagram of a relay-enabled portable wireless system.

Referring to FIG. 4, in one embodiment, portable wireless system 10 includes a short range wireless communication system 70 and a long range wireless communication system 72, each of which has a respective antenna 74, 76, a receiver 78, 80, a frequency synthesizer 82, 84, and a transmitter 86, 88. Portable wireless system 10 also has a voice/data system 90, a memory 92, a keypad, 94, a display 96, a mode selection switch 98, a battery power supply 100, and a controller 102 that choreographs the operation of portable wireless system 10. Short range wireless communication system 70 is configured to establish communication links with local third party electronic appliances in accordance with a low power communication protocol (e.g., the Bluetooth RF communication protocol or the IrDA infrared communication protocol). Long range wireless communication system 72 is configured to establish communication links with wireless network 18 in accordance with a conventional wireless protocol (e.g., a conventional analog cellular protocol or a digital wireless protocol, such as WAP). In a personal electronic appliance mode of operation, controller 102 configures portable wireless system 10 to operate as a conventional personal electronic appliance (e.g., a cellular telephone, a cordless telephone, a pager, a PDA, a digital audio player, or a laptop computer). In a third party wireless repeater mode of operation, controller 102 configures portable wireless system 10 to relay wireless signals 12, 14 between a third party electronic appliance 16 and a wireless network 18. In some embodiments, controller 102 may be implemented in a separate module (e.g., a PC card, such as a PCMCIA card) that plugs into a legacy portable wireless device.

Figure 5A:
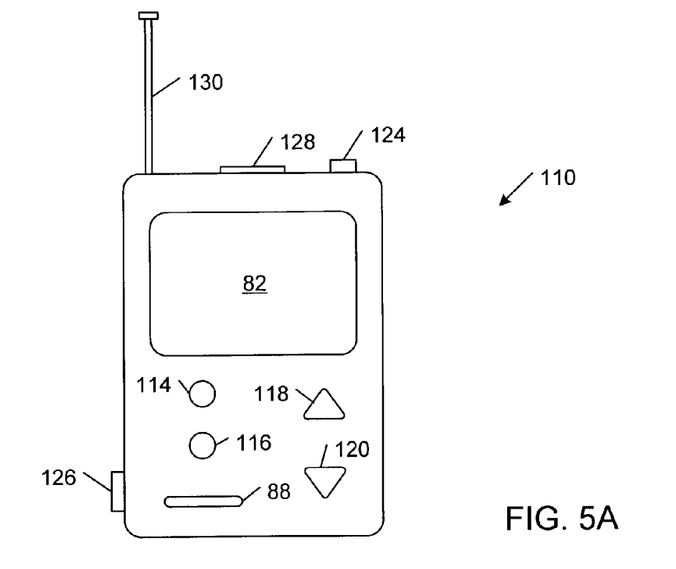
FIG. 5A is diagrammatic front view of a portable electronic appliance.

Referring to FIG. 5A, in one embodiment, third party electronic appliance 16 may be implemented as a handheld PDA 110. Handheld PDA 110 includes a screen 112 that displays a graphical user interface, which may present one or more user options for controlling the operation of handheld PDA 110. Handheld PDA 110 also includes various user controls, including one or more control buttons 114, 116, 118, 120. Handheld PDA 110 has an output port 124 for connecting to an input jack of an audio output device (e.g., headphones), and a cable port 126 for connecting to a computer or other hardware system. Portable media device further includes a wireless communication port 128, for example, an IrDA (Infrared Data Association) port, through which handheld PDA 110 may wirelessly communicate with other similarly configured devices. Some embodiments may include an RF antenna 130 instead of, or in addition to, wireless communication port 98.

Figure 5B:
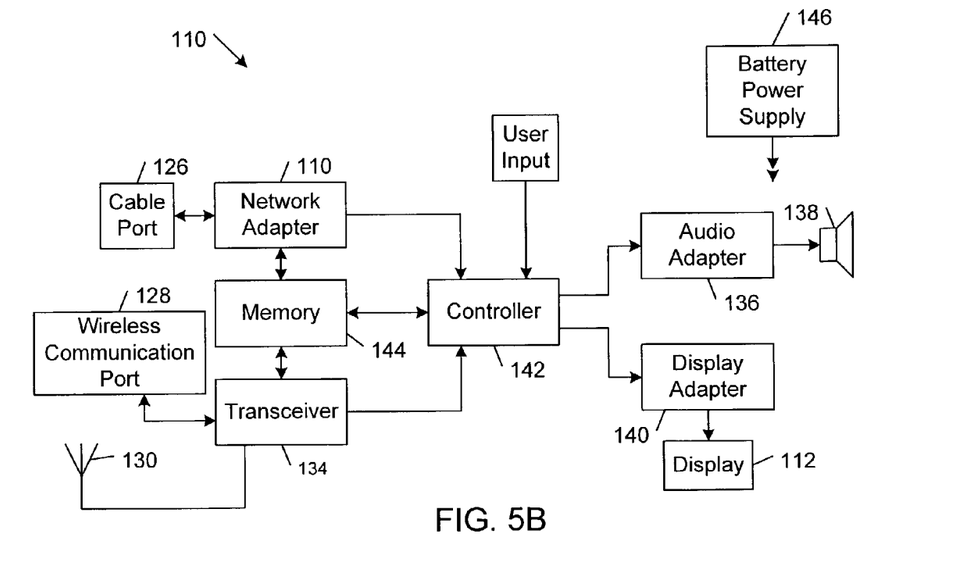
FIG. 5B is a block diagram of components of the portable electronic appliance of FIG. 5A.

As shown in FIG. 5B, handheld PDA 110 has a communication subsystem that includes a network adapter 132 that is configured to communicate through cable port 126 and a transceiver 134 that is configured to communicate through wireless communication port 128 (or antenna 130). Handheld PDA 110 also may have a digital content rendering subsystem that includes an audio adapter 136 that is configured to transmit digital audio data signals to one or more speakers 138, and a display adapter 140 that is configured to transmit image data signals to display screen 112. A controller 142 is configured to choreograph the operation of handheld PDA 110. Handheld PDA also may have a memory 144 that may include a random access memory (RAM) and a read only memory (ROM). In some embodiments, one or more other storage technologies may be used, including an internal hard drive and a removable storage device (e.g., a removable hard drive, storage card or disk). A battery power supply 146 supplies the electrical power needed to operate handheld PDA 110.

In other embodiments, the portable wireless system 10 may be implemented as a solid state digital audio player, a CD player, an MCD player, a camera, a game pad, a cellular telephone, a cordless telephone, a pager, a laptop computer, or other electronic device.

The systems and methods described herein are not limited to any particular hardware, firmware or software configuration, but rather they may be implemented in any computing or processing environment.

Other embodiments are within the scope of the claims.

What is claimed is:

1. A portable wireless system, comprising:
a controller operable to selectively configure the portable wireless system as a portable electronic appliance or a third party wireless repeater configured to relay wireless signals between a third party electronic appliance and a wireless telecommunication network, wherein the controller additionally is operable to wirelessly solicit the third party electronic appliance for a payment in exchange for relaying wireless signals between the third party electronic appliance and the wireless telecommunication network through the portable wireless system.

2. The system of claim 1, wherein the controller is operable to selectively configure the portable wireless system as a personal electronic appliance or a third party wireless repeater in response to a received mode selection signal.

3. The system of claim 2, wherein the mode selection signal is embedded in a received wireless communication signal.

4. The system of claim 1, further comprising a mode selection switch operable to selectively configure the portable wireless system as a personal electronic appliance or a third party wireless repeater.

5. The system of claim 1, wherein the controller is operable to enable the portable wireless system to relay third party wireless signals whenever the portable wireless system is available.

6. The system of claim 1, wherein the controller is operable to wirelessly seek and detect appropriately configured third party portable electronic appliances.

7. The system of claim 6, wherein the controller is operable to transmit an indication that the portable wireless system is available as a wireless repeater for third party communications.

8. The system of claim 1, further comprising a short range wireless communication system for communicating with third party portable electronic appliances, and a long range wireless communication system for communicating with the wireless telecommunication network.

9. The system of claim 8, wherein the short range wireless communication system and the long range wireless communication system each comprises an antenna, an RF receiver, and an RF transmitter.

10. A wireless telephony method, comprising:
selectively configuring a portable wireless system as a personal electronic appliance or a third party wireless repeater configured to relay wireless signals between a third party electronic appliance and a wireless telecommunication network, and
wirelessly transmitting from the portable wireless system to the third party electronic appliance a solicitation for a payment in exchange for relaying wireless signals between the third party electronic appliance and the wireless telecommunication network through the portable wireless system.

11. The method of claim 10, wherein the portable wireless system is selectively configured as a personal electronic appliance or a third party wireless repeater in response to a received mode selection signal.

12. The method of claim 11, wherein the mode selection signal is embedded in a received wireless communication signal.

13. The method of claim 11, wherein the mode selection signal is received from a mode selection switch of the portable wireless system.

14. The method of claim 10, further comprising enabling the portable wireless system to relay third party wireless signals whenever the portable wireless system is available and not in use as a personal electronic appliance.

15. The method of claim 10, further comprising wirelessly seeking and detecting appropriately configured third party portable electronic appliances.

16. The method of claim 15, further comprising transmitting an indication that the portable wireless system is available as a wireless repeater for third party communications.

17. The method of claim 10, further comprising providing an incentive to an owner of the portable wireless system in response to a received third party communication relayed by the portable wireless system.

18. The method of claim 17, wherein the incentive is provided to the portable wireless system owner based upon a received portable wireless system identifier.

19. The method of claim 17, further comprising determining whether a received wireless communication corresponds to a relayed third party communication.

20. The method of claim 17, wherein the incentive is in the form of a discounted wireless service price.

21. The method of claim 17, wherein the incentive is in the form of a coupon.

22. The method of claim 17, wherein the incentive corresponds to provision of the portable wireless system free of charge.

23. The method of claim 17, further comprising charging a fee to an owner of a third party electronic appliance that transmitted the received third party communication.

24. The method of claim 17, further comprising transmitting payment to the portable wireless system from a third party electronic appliance that transmitted the received third party communication.

25. A portable wireless system, comprising:
a controller operable to wirelessly communicate with a wireless telecommunications network simultaneously over a direct wireless connection and an indirect wireless connection to increase bandwidth available for wireless communications with the wireless telecommunications network, wherein the controller establishes the direct wireless connection directly between the portable wireless system and the wireless telecommunications network and the controller establishes the indirect wireless connection through a device operable to relay wireless signals between the portable wireless system and the wireless telecommunication network.

26. The system of claim 25, wherein the portable wireless system is a cellular telephone.

* * * * *